United States Patent [19]

Martin

[11] 4,280,185

[45] Jul. 21, 1981

[54] ENGINE MODULE LIFE TRACKING SYSTEM

[75] Inventor: Anthony N. Martin, Simsbury, Conn.

[73] Assignee: United Technologies Corporation, Hartford, Conn.

[21] Appl. No.: 64,226

[22] Filed: Aug. 6, 1979

[51] Int. Cl.³ .......................................... G01M 15/00
[52] U.S. Cl. ..................................... 364/506; 73/112; 340/52 R; 350/96.24; 364/431; 364/552
[58] Field of Search ............... 364/424, 431, 506, 552, 364/551, 900; 340/52R; 60/223; 73/112; 116/201, 202, 302; 350/96.24

[56] References Cited

U.S. PATENT DOCUMENTS

| 3,357,239 | 12/1967 | Hohenberg | 364/431 |
| 3,362,217 | 1/1968 | Evans et al. | 364/431 |
| 3,918,392 | 11/1975 | Gibson et al. | 116/302 |
| 3,946,364 | 3/1976 | Codomo et al. | 364/900 |
| 3,979,579 | 9/1976 | Kleinpeter | 364/506 |
| 4,128,005 | 12/1978 | Arnston et al. | 364/431 |
| 4,135,246 | 1/1979 | McMannis | 364/506 |
| 4,159,531 | 6/1979 | McGrath | 364/424 |

Primary Examiner—Errol A. Krass
Attorney, Agent, or Firm—Dominic J. Chiantera

[57] ABSTRACT

A life tracking system (LTS) provides a life history recording for each module of a gas turbine engine, including module type and serial number together with total use, or operating time for each module. The total use may include total actual operating hours, total operating time under known high stress conditions, a weighted total time reflecting operational parameters, or any combination of these use indicators. The module information is stored as a permanent record with the module identification (ID) in a read/write non-volatile memory which may be read by a ground based data system. As such, each engine module may be tracked, automatically, from manufacture through its total life cycle in each engine configuration and/or aircraft in which it is used, without the necessity of human recording.

9 Claims, 12 Drawing Figures

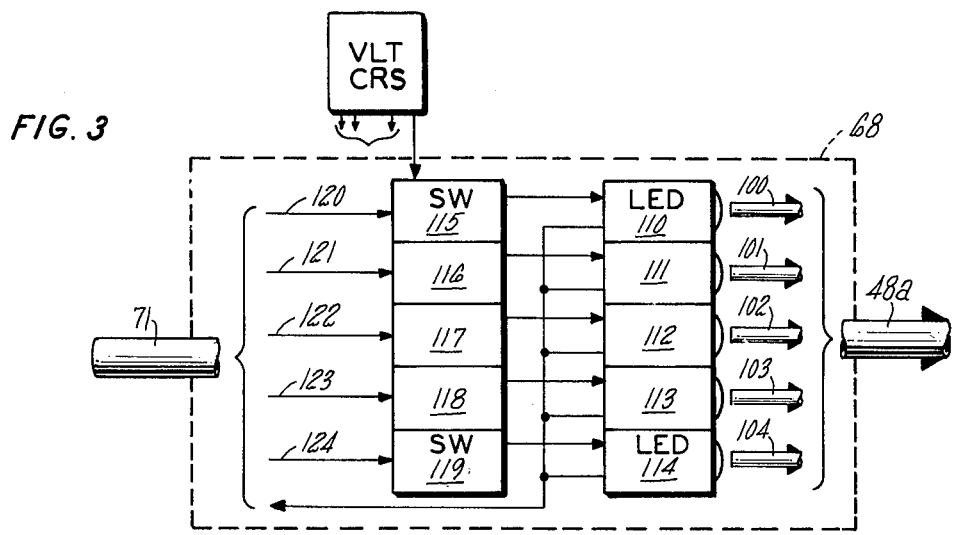
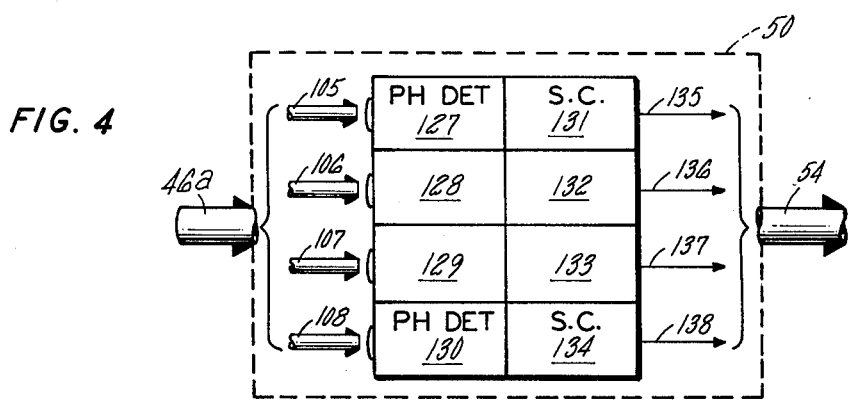
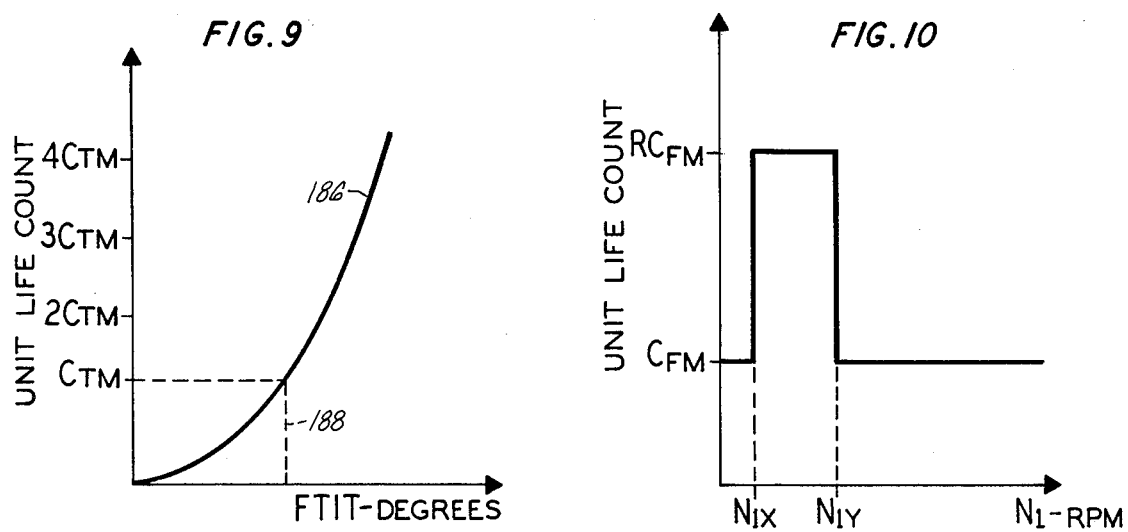

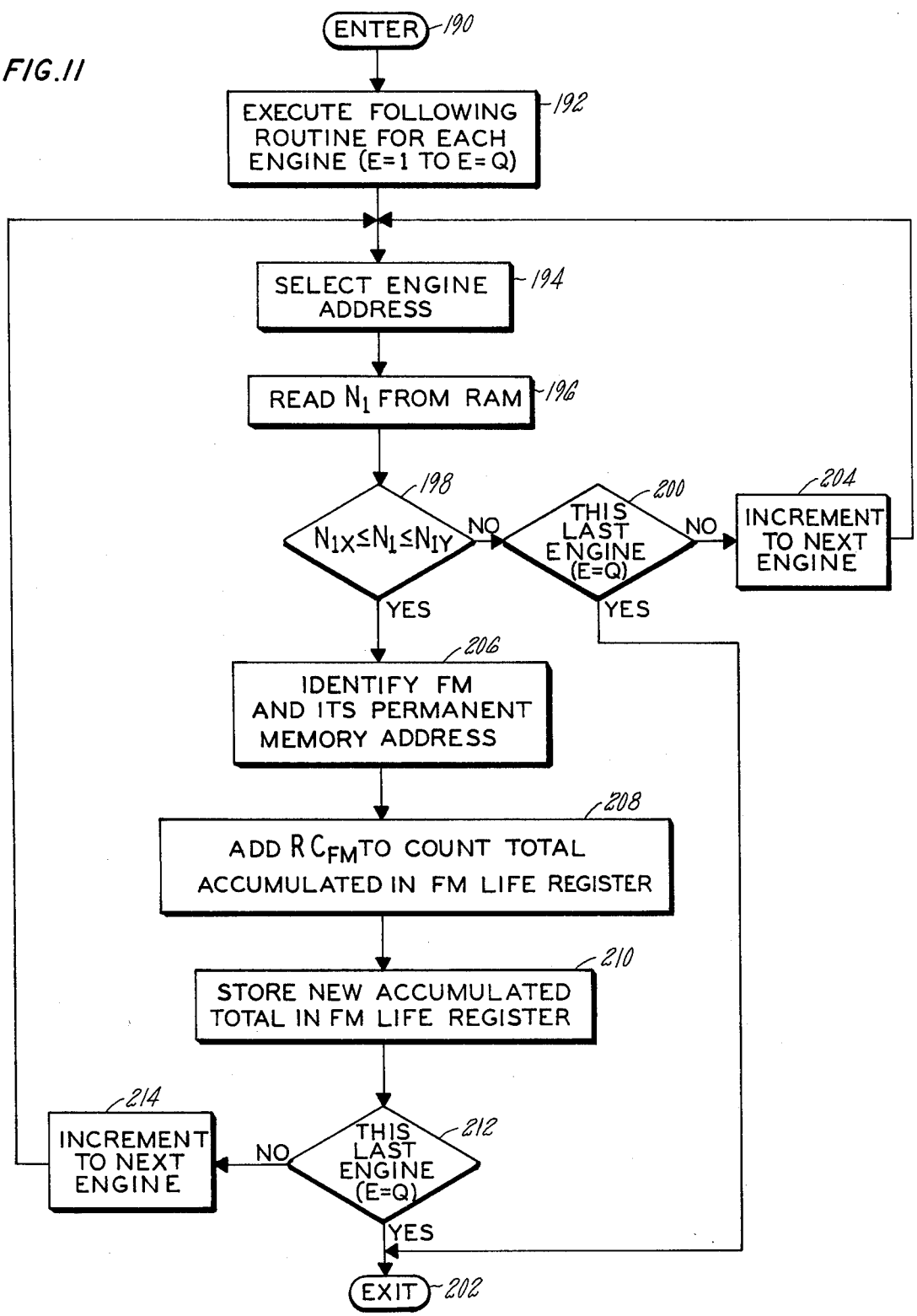

ENGINE MODULE LIFE TRACKING SYSTEM

BACKGROUND OF THE INVENTION

1. Field of Invention

This invention relates to information recording systems, and more particularly to a fully automated tracking system for recording the service life history and configuration of gas turbine engines.

2. Description of the Prior Art

Modern jet engines, such as the F-100 gas turbine engine, are constructed on a modular basis. In the F-100 engine there are as many as six separate engine modules which in combination make up the entire engine assembly. This allows individual modules to be replaced at periodic service intervals, when their individual service life is used up, or when unanticipated failure occurs. Each module is identified at manufacture with a data plate, mounted at a convenient location on the module body, which provides module information including an identification (ID) code typically having a mnemonic identifying the type of module and a multi-digit serial number. Each data plate is visible on the module, however, once assembled in the engine data plates of the modules installed within the engine housing are not visible. Even for visible modules the data plates may be inaccessible in the assembled engine. As a result the logistics involved in tracking a given module during its service life, or in maintaining current configuration information on a particular engine, involves manual recording of the module data plate information prior to installation. These present tracking schemes rely heavily on the reliability of manual logging on paper forms by maintenance personnel and the manual transcribing via keypunch into an information system. This, however, is subject to user apathy and inaccuracy, resulting in information gaps as to the history of any individual engine module which severely limit the ability to analyze and diagnose engine malfunctions, or in providing accurate information for use in investigative procedures of aircraft malfunctions.

SUMMARY OF THE INVENTION

One object of the present invention is to provide a life tracking system (LTS) for permanently recording, automatically, the identified configuration of a gas turbine engine by engine module type and serial number. Another object of the present invention is to provide an LTS which further records, automatically in permanent record, selected performance parameters for any one or all of the identified engine modules. Still another object of the present invention is to provide engine mounted module identifier units for automatically providing engine module identification signal information to an LTS.

According to one aspect of the present invention an LTS includes a non-volatile memory, a life tracking unit (LTU), and a plurality of module identifier units mounted on associated engine modules which provide the module identification signal information to the LTU, the LTU including an electronic signal processor which periodically interrogates each of the module identifier units and stores the identification signal information received in response at permanent address locations in the non-volatile memory. In further accord with this aspect of the invention the LTU processor includes a real time clock for establishing real time periodic intervals for interrogating the module identifier units, each set of received identification signal information being stored at the permanent address in non-volatile memory together with the actual value of the real time signal at the time of interrogation of the particular module identifier unit. In still further accord with this aspect of the invention the LTS further includes engine sensors mounted on selected engine modules of the gas turbine engine, each providing the actual signal value of a selected engine performance parameter associated with the module, the LTU receiving the sensed parameter actual value signals and providing permanent recording of the actual value at selected real time intervals at a permanent address location in the non-volatile memory associated with the identification signal information of the particular module providing the parameter.

According to another aspect of the present invention, an engine module identifier unit provides the identification signal data in the form of optical signals encoded by a data plate optical mask sealed between the mating major surfaces of a base portion and cover portion of the identifier unit enclosure, the base and cover portions each including a plurality of fiber optic waveguides terminated at one end at the major mating surface thereof in an identical matrix array of rows and columns, the waveguides being terminated at another end at the LTU, the two portions being adapted to provide registration of each matrix array on either side of the optical mask sealed therebetween in the assembled enclosure, the data plate optical mask having perforations therethrough at selected locations among the rows and columns of the matrix for providing optical paths through the identifier unit, whereby the location of the optical paths provide the encoded optical signal representative of a particular module identification.

According to still another aspect of the present invention an engine module identifier provides the identification signal data in the form of electrical signals, one associated with each column of a matrix of rows and columns definitive of an alphanumeric code displayed along a first one of two major surfaces of a data plate sealed between the mating major surfaces of a base portion and a cover portion of the identifier unit enclosure, the amplitude of each individual signal defining the particular information, whether alpha or numeric, which is encoded on the data plate and which in combination define the engine module mnemonic identifier and the serial number.

The LTS of the present invention provides a permanent history recording of a gas turbine engine by module type and serial number identification and total usage in one or more selected indicators, such as overall operating time, total operating time under high stress conditions, mode operating profiles, or a weighted operating time. The preserved information is available for readout to a ground based information system at routine intervals which maintains at a fixed location the compiled history of each module. This eliminates the necessity of manual information logging and its inherent inaccuracies. Similarly the engine module identifier units used in the LTS provide instantaneous engine configuration identification which is presently impossible in a fully assembled gas turbine engine.

These and other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a simplified schematic illustration of a circuit element used in the LTS of FIG. 1 in conjunction with the module identifier unit of FIG. 2;

FIG. 4 is a simplified schematic illustration of another element used in the embodiment of FIG. 1 in conjunction with the module identifier unit of FIG. 2;

FIG. 9 is an illustration of an engine performance parameter relationship as may be used in the LTS of FIG. 1;

FIG. 10 is an illustration of another engine performance parameter relationship as may be used in the embodiment of FIG. 1;

FIG. 11 is a simplified logic flowchart diagram illustrating the steps incorporated in a recording function as may be used in the LTS of FIG. 1.

DETAILED DESCRIPTION

Figure 1:
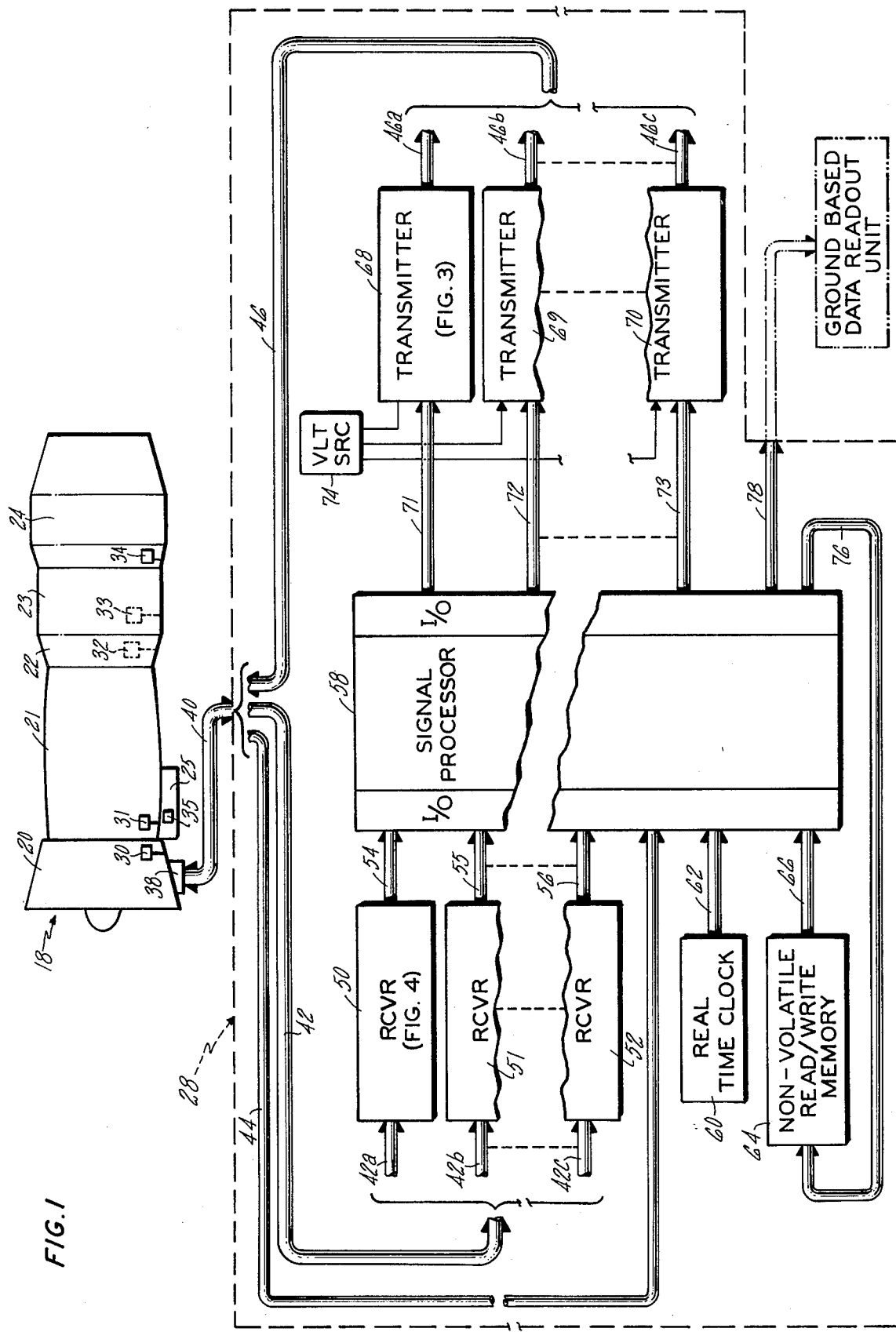
FIG. 1 is a simplified block diagram illustration of an LTS according to the present invention.

Referring to FIG. 1, in an illustrative embodiment of the LTS of the present invention for use with an F-100 gas turbine engine, the engine 18 has six identified engine modules which include: an inlet fan module (FM) 20, a core engine module (CM) 21, a high turbine module (HT) 22, a fan drive module (TM) 23, an augmentor and nozzle module (AM) 24, and a gearbox module (GM) 25. The LTS comprises a life tracking unit (LTU) 28 which may be mounted on or off the engine and which in FIG. 1 is illustrated as off-engine mounted, and a plurality of engine module identifier units 30-35 disposed on associated ones of the engine modules 20-25. The module identifier units 32, 33 for the HT and TM modules are mounted internal of the engine structure such that they are completely inaccessible in the assembled engine configuration. For the F-100 gas turbine engine the interconnections between engine mounted equipment (module identifiers, engine parameter sensors, etc.) and off-engine mounted equipment are made through a "J" box connector 38 disposed on the FM module.

The interconnections between the LTU and the engine are provided through the lines 40, which include: receiving lines 42, 44 for receiving identification signal information from the module identifier units and from engine mounted sensors which provide actual values for selected engine performance parameters, as described hereinafter, and transmitting lines 46 for transmitting command signal information from the LTU to the identifier units. Inside the LTU the signal lines from each of the module identifier units 30-35, as illustrated partially by the lines 42a-42c, are presented to receiver networks 50-52. Typically each module identifier is connected to an individual receiver such that receivers 50-52 illustrate only a portion of the total required. The receiver configuration and function is dependent on the type of engine module identifier unit used in the LTS, as described in detail hereinafter.

The outputs from the receivers are presented through lines 54-56 to the input/output (I/O) stage of a signal processor 58 of a type known in the art, such as the 8084 microprocessor manufactured by INTEL. The LTU processor could be the same one used in the aircraft electronic engine control (EEC) system, if such is available to provide the signal processing for the LTU on a time shared basis. In addition to the identification signal data the processor also receives at the I/O: the sensed parameter signals on the lines 44, the output from a real time clock 60 on the lines 62, and the output from a read/write memory 64 on the lines 66. The memory 64 is non-volatile and may comprise one or more electronic read only memories (EROMs) of a type known in the art. The size or number of EROMs is determined by the permanent storage requirements. It may be preferred to provide storage for successive replacement modules of the same type for each engine thereby allowing for a permanent history record for the aircraft service life which extends well beyond that of the particular engine configuration.

The processor transmits signal information to each of the module identifier units through transmitter networks associated with each module, as partially illustrated by the networks 68-70 connected to the processor I/O through lines 71-73. The transmitter networks are also connected to a voltage source 74 in the LTU. As with the receivers the transmitter function is determined by the type of module identifier unit selected for the system. As described hereinafter the recorded life history and engine configuration information is presented from the processor to the memory 64 on lines 76, and is also made available for readout to an outside unit, such as a ground based data readout unit (shown in phantom) on output lines 78.

Figure 2:
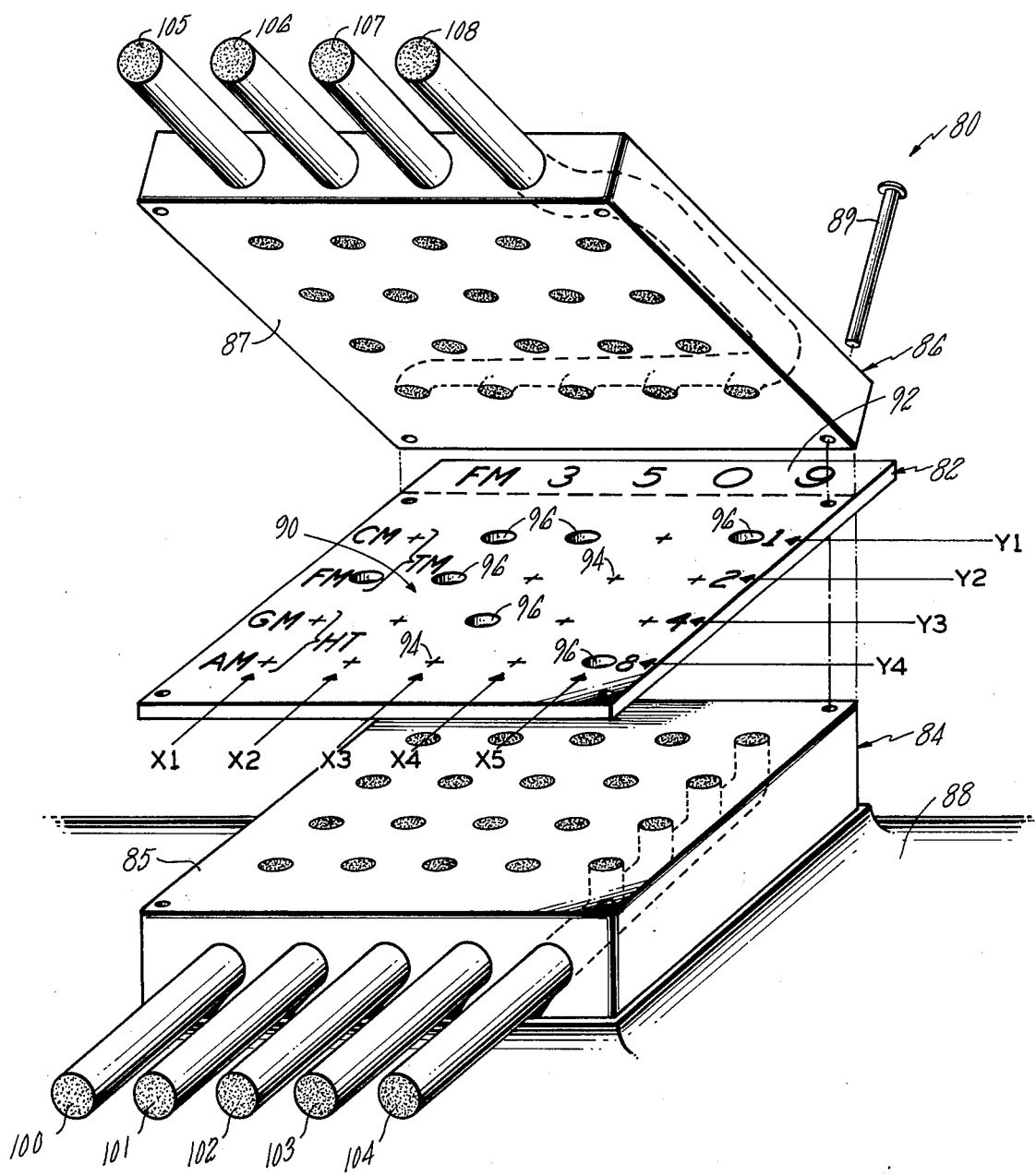
FIG. 2 is an exploded view, taken in perspective, of an engine module identifier unit as may be used in the LTS of FIG. 1.

Two types of engine module identifier units may be used in the LTS as deemed suitable in view of the engine performance specifications regarding temperature, vibration, and electromagnetic interference (EMI). A first type is an optical encoder using fiber-optic waveguides. Referring to FIG. 2, in an exploded, perspective view of an optical engine module identifier unit 80, an optical mask 82 is mounted in an enclosure comprising a base portion 84 with a mating major surface 85 and cover portion 86 with a major mating surface 87. The base portion 84 is disposed directly on the surface 88 of the engine module at a location selected by the manufacturer, and the upper portion 86 and mask 82 are secured to the base through the use of a suitable mechanical mounting, such as a rivet 89 at each of four corners of the enclosure to provide an assembled laminar structure.

The mask 82 is typically a metal plate having two major surfaces, top and bottom. One surface of the mask includes an encoder portion 90, and a tab portion 92 which is visible in the assembled enclosure. The encoder portion includes a matrix of preformed "knockouts" 94 arranged in N number of rows and M number of columns, the actual numbers depending upon the alphanumeric identification (ID) code required for the module. For a mnemonic plus four-digit serial number ID the mask 82 has five columns. One column (X1) for the mnemonic and four columns (X2-X5) for the four-digit serial number. Each column includes four rows (Y1-Y4) corresponding to a four-bit binary code with each row stamped with its decimal equivalent. This facilitates easy serial number encoding at the time of module manufacture by making perforations 96 at the appropriate rows in each serial number column (X2-X4). The six module mnemonics are similarly stamped adjacent the first column (X1) with single perforations required for CM, FM, GM and AM, and two perforations required to encode the remaining TM, HT. The ID information encoded on the portion 90 is also scribed, or stamped on the tab 92 to permit visual readout when the identifier unit is assembled.

The base and cover portions each enclose a plurality of fiber-optic waveguides 100-104 and 105-108 respectively, which terminate at the major surfaces 85, 87 in a matrix of rows and columns identical to that of the mask 82. Each set of waveguides are terminated at the other end in the LTU. The waveguides exit from each of the portions 84, 86 and are routed through the "J" box (38, FIG. 1) of the engine to the LTU on the lines 42 and 46. The fiber-optic waveguides may be provided either as flexible strips, or ribbons, capable of lying flat along the engine surfaces, or as in current practice in a circular bundle which may be encased in a protective metal jacket. The waveguide material may be either a glass of the lead boro-silicate type for use on modules where the engine temperatures are less than 600° F. (316.1° C.), or alternatively for those engine locations where the ambient temperature may reach 1,000° F. (537.78° C.), a fused silica glass may be used.

When fully assembled the matrices of each portion are in registration with that of the mask, such that each perforation of the mask matrix provides a completed optical light path between the two portions. With selective perforations of the mask, the appropriate mask identification information is encoded in a plurality of optical signals (one for each column). Each of the waveguides 100-104 are terminated at each of the four rows (Y1-Y4) in an associated one of the columns (X1-X5). The waveguides 105-108 are each terminated at each of the five columns in an associated one of the four rows (Y1-Y4). Either set of waveguides may function as the light transmitting lines to provide the light energy to the module identifier unit while the second set provides the completed optical path to the LTU.

For the optical module identifier unit 80 the LTU transmitter networks (68-70, FIG. 1) include light transmitting devices for providing the optical energy to the module identifier units. One transmitter may be used to provide excitation to all of the units; alternatively each unit may have its own transmitter. In FIG. 3, one embodiment for the transmitter network includes a plurality of light sources, such as light emitting diodes (LEDs) 110-114, one each for each of the light transmitting waveguides 100-104 enclosed in the lines 48a. Each LED is excited through associated voltage controlled switches 115-119 each connected to the voltage source 74. The switches are gated on by applied gate signals presented from the processor on lines 120-124 enclosed in the lines 71 (FIG. 1). The LEDs are typically energized in sequence to provide the light energy to one column at a time, each for a time interval sufficient to permit reading of the four row waveguides (105-108, FIG. 2) monitored by the receivers (50-52, FIG. 1). Referring now to FIG. 4, one embodiment for a receiver (50, FIG. 1) suitable for use with the optical identifier unit includes photodetectors 127-130 which detect a completed optical path on the associated one of the matrix row waveguides (105-108, FIG. 2) presented in the lines 46a (FIG. 1) to the receiver. The voltage output signals from each photodetector representative of a present optical signal in the associated waveguide are presented to signal conditioners 131-134 which provide a processor compatible signal representative of the received optical signal. The conditioned signals are presented through lines 135-138 within the lines 54 to the signal processor 58. It should be understood that the transmitter and receiver embodiments of FIGS. 3, 4 are illustrative of one type of configuration which may be suitable for use. Any other one of a number of networks using light sources and light detectors, whether individual sources or in a multiplexing manner, may be used as deemed appropriate.

Figure 5:
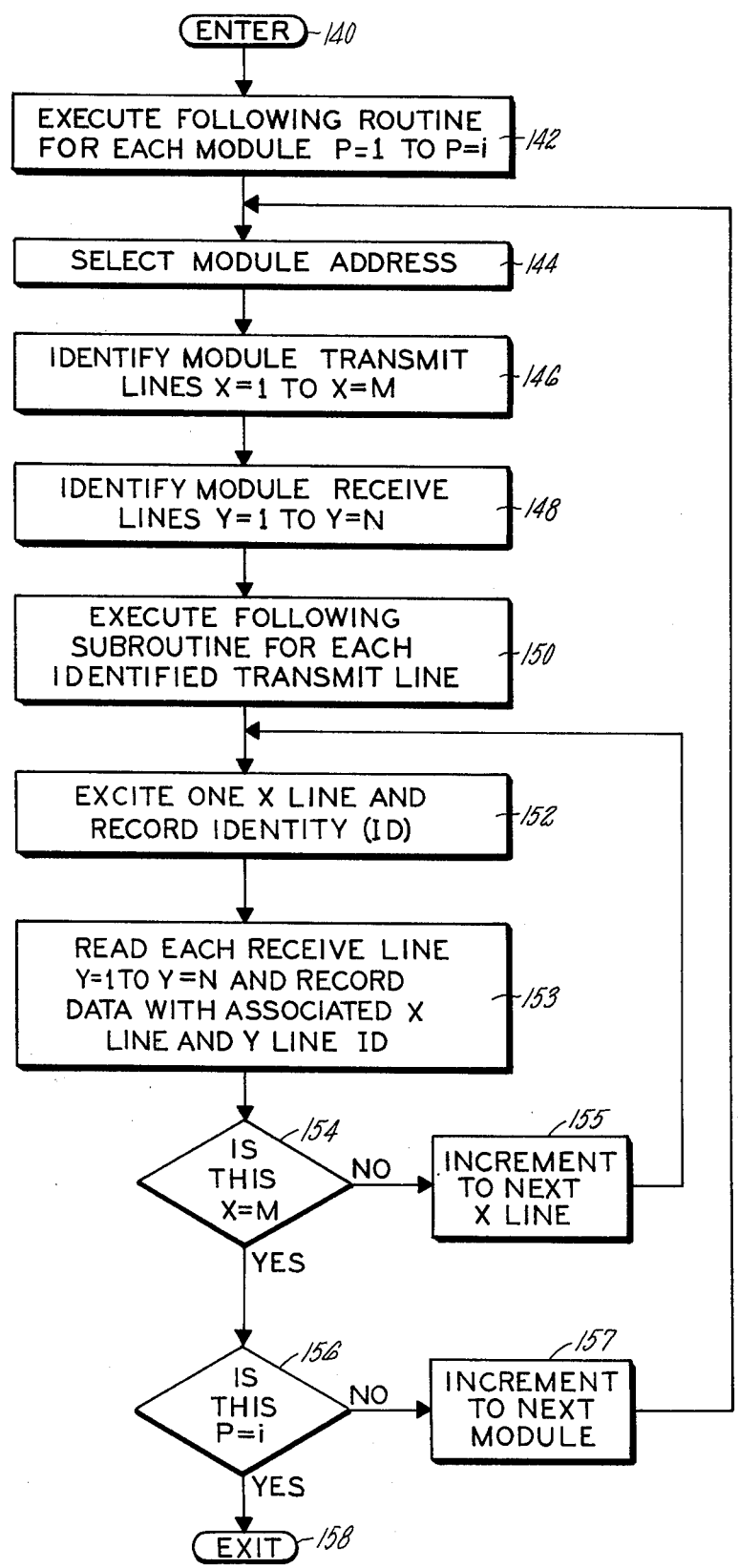
FIG. 5 is a simplified logic flowchart diagram illustrating the steps of one of the engine module identification routines performed by the LTS of FIG. 1.

In operation, the LTU identifies each engine module by interrogating the associated module identifier unit through execution of a module identification routine as shown in FIG. 5. The processor enters the routine at 140, and instructions 142 request execution of the module identifying routine. Instructions 144 command processor selection of a first module by its address and instructions 146 request identification of the module column, or transmit lines (100-104, FIG. 1 for the module 80 of FIG. 2). The module row, or receive lines are next identified in instructions 148. The identification of the transmit and receive lines represent the particular I/O locations of the processor associated with those lines. Instructions 150 next command execution of the subroutine to interrogate the selected module to determine the optical code programmed on the mask 82 (FIG. 2). Instructions 152 request excitation of one of the transmit lines, such as line 100, and the recording of its identity (X1) in the processor random access memory (RAM). Instructions 153 next request the scanning of each of the receive lines (105-108) in sequence to detect the presence or absence of a signal bit on the particular line, and the recordation of this data together with the identity of the associated row (Y1-Y4) in RAM, this information being recorded at the location of the particular column ID in RAM. To illustrate with reference to FIG. 2, light energy on the line 100 with the FM mnemonic punched out results in a data bit in column X1, row Y2, and the examination of rows Y1-Y4 results in a binary 0010 for the column X1. Instructions 154 next determine whether the excited line is the final one and if not instructions 155 command the processor to increment to the next numbered transmit line (X2) and reexecute the subroutine. In this manner each of the transmit lines are excited and each of the rows are monitored for the presence of signal bits. The information encoded by the optical mask 82 is recreated in RAM and read out to the non-volatile memory 64 for permanent storage. Following a YES answer to instructions 154 instructions 156 determine if this is the last module, and if not instructions 157 request that the processor increment to the next identified module. Following interrogation of each module the processor exits the flowchart at 158.

Figure 7:
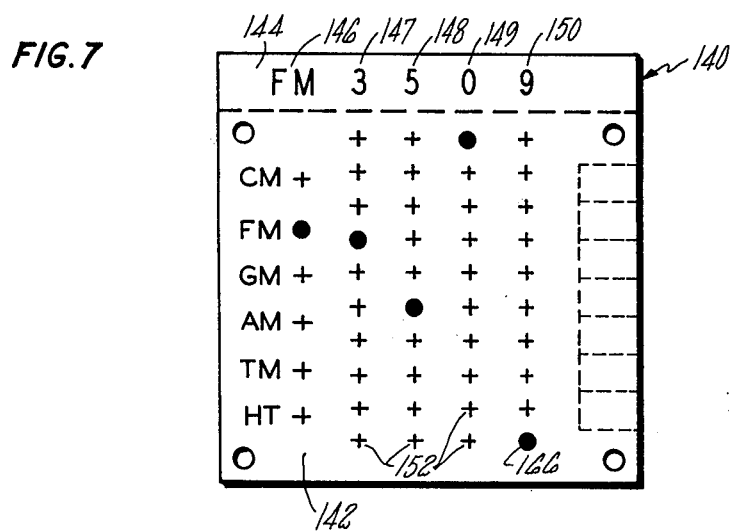
FIG. 7 is an elevation view of one element of the module identifier unit of FIG. 6.

Another type of engine module identifier unit which may be used with the present system is an electronic type which encodes the data plate identification information by changing the conductivity of an electrical current path through the individual columns of the data plate matrix. Referring to FIG. 7 a data plate 140 for use with an electronic module identifier unit includes an encoding portion 142 and a tab portion 144, in the same manner as the optical mask 22 (FIG. 2). In the illustrative embodiment the encoder portion includes a two-letter mnemonic code in a column 146 and a four-digit serial number code in columns 147–150. Each of the digit columns are arrayed in a pure decimal configuration and selection of a 0–9 digit is accompanied by the perforation of the data plate at the appropriate "knock out" 146. Similarly the mnemonics are printed along the column 146 each adjacent a preformed knock out. As in the optical identifier the encoder portion 42 visually displays the information via the completed perforation process performed at the time of manufacture, and the tab is inscribed with the module ID in alphanumeric fashion.

Figure 8:
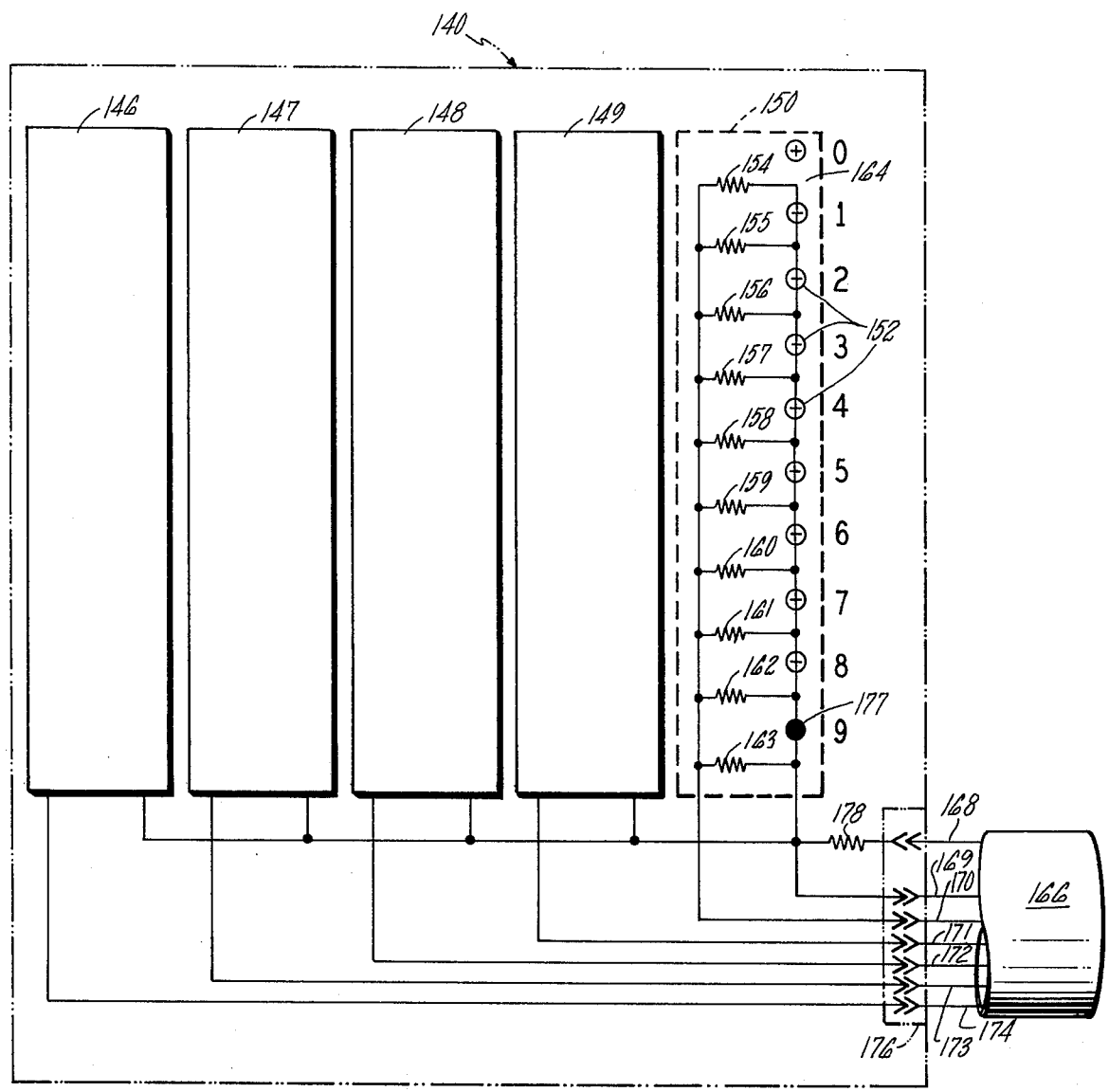
FIG. 8 is a simplified schematic illustration used in the description of the module identifier unit of FIG. 6.

Typically the columns 146–150 are each resistive ladder configurations of thick film resistors deposited on the plate, which is a printed circuit board. As illustrated in FIG. 8 for the column 150 ten resistors 154–163 are arrayed in parallel in the ladder configuration 164. Connection between the LTU and the module identifier unit is through a cable 166 which includes: an excitation line 168 and a signal readout line 169, each common to all of the columns, and lines 170–174 providing the low signal side ground return for each column. The electrical connection to the cable 166 is provided through a connector 176. The line 168 presents an excitation signal $V_{EXC}$ from the LTU through a reference resistor 178 ($R_{ref}$) to one leg of each of the ladders. The line 169 monitors the sensed output voltage signal $E_0$ from each ladder, each signal having an amplitude inversely proportional to the particular ladder resistance ($R_L$). Isolation between the resistive ladder of each column is provided by completing the ground path through the associated one of the return lines 170–174, sequentially, one at a time, and measuring the product of the ratiometric value of the ladder resistance and the reference resistor multiplied by $V_{EXC}$.

In operation, the total resistance of the ladder is the parallel equivalent resistance of all the resistors, or:

$$R_L = \frac{1}{\Sigma \frac{1}{R_{154-163}}}$$

Encoding the digit "9" in the column 150 requires a perforation 177 resulting in a total resistance value equal to that of the resistor $R_{163}$, and the signal magnitude $$E_O = V_{EXC} \frac{R_{163}}{R_{163} + R_{REf}}.$$

The reference resistor 178 is also a thick film resistor of the same type as those of the ladder and is deposited directly on the data plate PC board. The reference resistor experiences the same temperature environment as those of the ladder such that the output signal magnitude being the ratiometric value of the ladder and reference resistor values is substantially free from temperature error effects.

Figure 6:
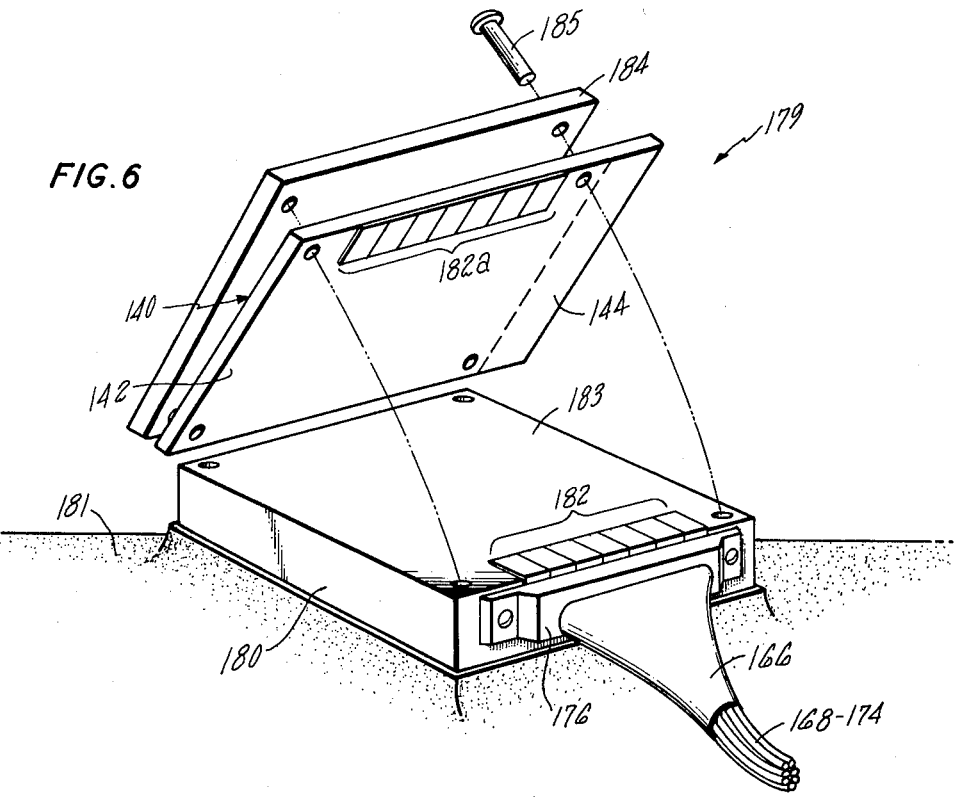
FIG. 6 is an exploded view, taken in perspective, of another engine module identifier unit as may be used in the LTS of FIG. 1.

Referring now to FIG. 6, in an exploded, perspective view of the electronic module identifier 179 the data plate 140 is enclosed in a manner similar to that of the identifier unit 80 (FIG. 2). A base portion 180 is disposed directly on the engine module surface 181, and includes the connector 176 with individual contacts 182 arranged along one edge of the mating major surface 183. The data plate includes a mating array of contacts 182a which make electrical contact with the contacts 182 in the assembled enclosure. As with the unit 80 a cover portion 184 is included, which is bolted, or riveted to the base portion 180 to captively engage the plate 140 in a laminar type structure. The tab portion 144 of the plate extends beyond the mechanical sandwich configuration to provide a readily visible alphanumeric ID of the module.

Referring again to FIG. 1, the LTU life history recording of each module may include: total actual "on time" hours, the actual time in which a module is operating within a particularly high stress condition, or a weighted accumulated time. The recording of the total "on time" hours is provided through a simple routine executed by the signal processor which monitors the lapsed time for each using the real time clock 60.

The information recorded for each module is accumulated in the non-volatile memory 64, each module being assigned a portion of the memory which acts as a life register for storing the recorded life history of the module. The memory requirement is dependent on the number of engines (and there fore total number of modules) and is generally selected to allow for more than one module of a given type for each engine, such that the information stored may represent the succession of a number of engine configurations. The information stored in the non-volatile memory is always available for readout to the ground based unit upon request to the processor 58. The memory itself is not directly accessible to the ground based unit to ensure the integrity of the stored information.

In recording the actual operating time of a particular module under specified conditions, the engine performance parameters which define the existence of such a condition must be known and measured. The specified conditions relate to known higher stress conditions detrimental to module service life and are generally based on the peculiar operating mode problems of a particular type engine module, as may be prescribed by the engine manufacturer. An example of a known critical operating mode for the inlet fan module 21 is that of fan speed ($N_1$) operation within a defined speed band related to a higher fan blade fatigue. This is referred to as the fan speed "flutter region" which is a low cycle speed band, close to the starting speed. It is desirable to record the actual operating time of the fan module within this critical speed band, in addition to recording the other use parameters such as total hours of general operational time, since the low cycle operation represents an accelerated use rate in terms of mean time between failure for the module. A similar critical parameter for the fan drive turbine module (TM) is fan turbine inlet temperature (FTIT). The problems of degree of "metal creep" of the fan turbine blades as a function of FTIT temperature is an exponential relationship resulting in a significant shortening of the permitted time intervals between maintenance when the fan turbine is required to operate at accelerated FTIT values.

FIG. 9 illustrates generally the exponential relationship between FTIT and the fan turbine unit life count in hours. The life count may be any interval of time, typically in hours, which is assigned for the particular module. The value of FTIT below a nominal value 188 results in a single count increment, whereas higher FTIT temperature operation results in a multiple count value determined from the exponential curve 186. (Turbine module life is typically a time function weighted by FTIT, such that the count rate increases dramatically at higher temperature values.) For the fan module the low cycle fatigue is of particular interest in addition to the total "on time". FIG. 10 illustrates a single unit life count ($C_{FM}$) for all values of $N_1$ outside of the low cycle speed band defined as $N_{1X} \leq N_1 \leq N_{1Y}$. The count increases by a factor (k), as determined from the engine reliability information, for operation within this band.

The recording of fan module accelerated use as a function of fan speed is provided through a simple routine executed by the processor as illustrated by the flowchart of FIG. 11. The processor enters the program at 190 and for a multiple engine LTS instructions 192 command the execution of the fan module recording routine for each engine (E) up to an E=Q number. Instructions 194 request the first engine address in RAM, and instructions 196 request a readout of the most recently sampled $N_1$ value stored in RAM. Instructions 198 next request comparison of the actual $N_1$ value with the lower ($N_{1X}$) and upper ($N_{1Y}$) limits of the low cycle speed band. If the actual fan speed is not within this band instructions 200 request a determination of whether this is the last engine, and if YES the processor exits the flowchart at 202. If this is not the last engine instructions 204 request the processor to increment to the next engine, thereby starting the routine again. If the actual speed is within the defined low cycle band instructions 206 request the identification of the fan module by its serial number ID, and the address location for the particular FM in permanent memory. Instructions 208 request the addition of an added count ($kC_{FM}$) to the total count accumulated for the particular FM. Instructions 210 next request the processor to store the newly accumulated total in the FM life register at its permanent memory address, after which instructions 212 determine if this is engine E=Q, and if NO then instructions 214 command the processor to increment to the next engine. If the answer to instructions 212 is YES the processor exits the flowchart at 202.

Figure 12:
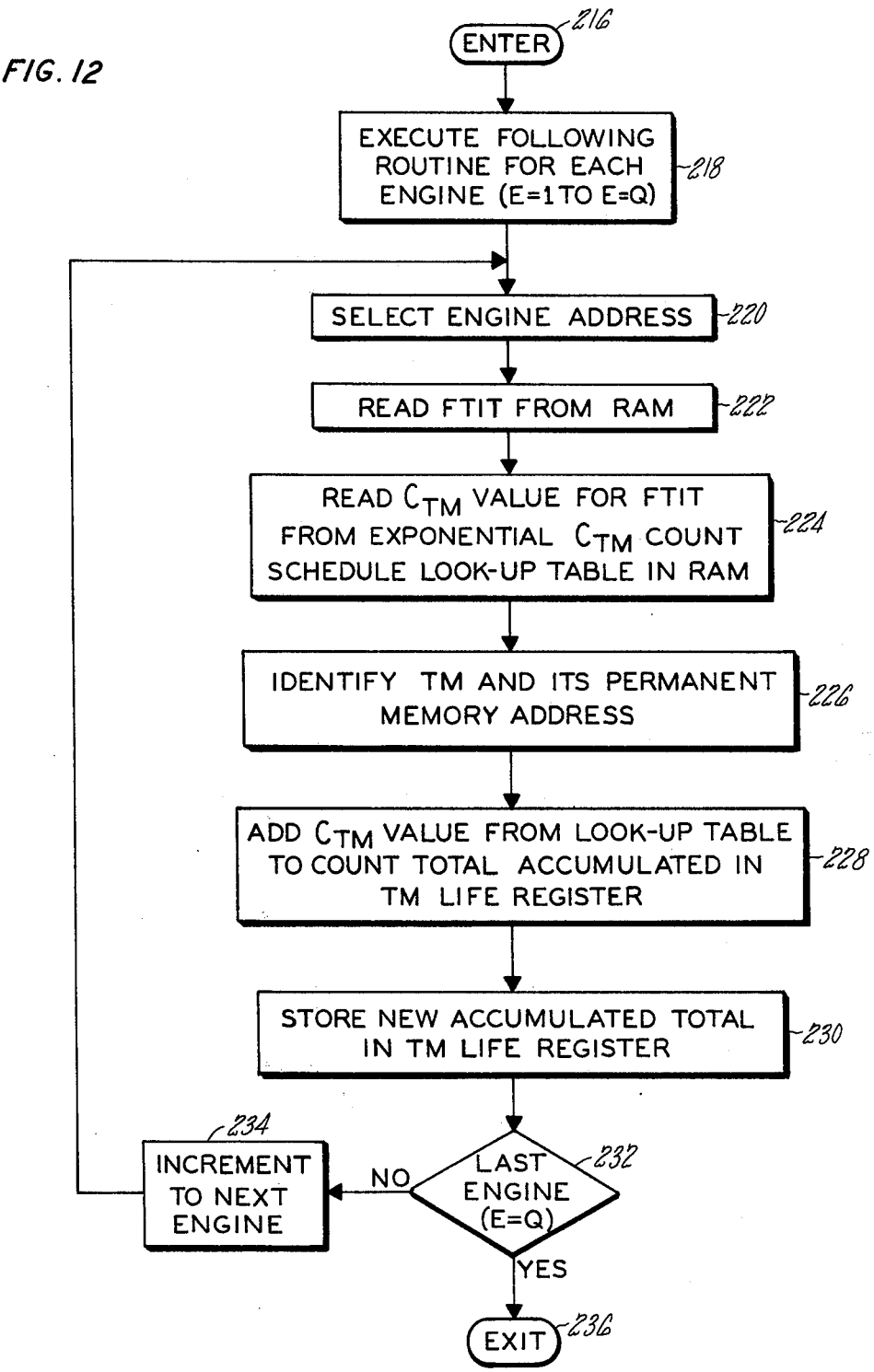
FIG. 12 is a simplified logic flowchart diagram illustrating the steps of another recording function as may be used in the LTS of FIG. 1.

FIG. 12 illustrates the flowchart for use with the history recording of turbine module (TM) use. Here the processor enters at 216 and instructions 218 command the execution of the listed routine for each engine. Instructions 220 start the routine with a command to select the first engine address, after which instructions 222 command readout of the most recently sampled actual FTIT value stored in RAM. Instructions 224 request the readout of the appropriate $C_{TM}$ value for the stored actual FTIT value from a look up table in RAM which defines the exponential schedule of FIG. 9. Following determination of the appropriate count value, instructions 226 request the ID of the particular TM and its permanent memory address. Instructions 228 command the processor to increment the present total accumulated TM count by the most recent $C_{TM}$ value and instructions 230 request the processor to store the newly accumulated total in the particular TM life register. Instructions 232 request a determination of whether this is the last engine. If the answer is NO, instructions 234 command the processor to increment to the next engine address and if the answer is YES the processor exits at 236.

The routines illustrated by the flowcharts of FIGS. 11, 12 may be modified to also include the total hour use time. Similarly the flowcharts may be modified, as deemed necessary, to accommodate any particular recording system or any additional recording requirements for either module, all through programming techniques known to those skilled in the programming art.

The LTS of the present invention records the use and life history of each engine module in a non-volatile memory which is accessible for readout into a ground based system upon request. Manual recording of engine configurations is eliminated through the use of the module identifier units, either electro-optical or electronic, which provide the engine module data plate information on request of the LTU processor. In addition each identifier unit provides for visual readout of the data plate information. The LTU functions may be performed in whole, or in part, by the on board processor used in the electronic engine control, if available. Otherwise a dedicated microprocessor of a type known in the art may be used. Similarly, although the invention has been shown and described with respect to illustrative embodiments thereof, it should be understood by those skilled in the art that the foregoing and various other changes, omissions and additions in the form and detail thereof may be made therein without departing from the spirit and scope of the invention.

Having thus described typical embodiments of my invention, that which I claim as new and desire to secure by Letters Patent is:

1. A life tracking system (LTS) for automatically identifying and recording the instant configuration of a gas turbine engine by engine module type and serial number, comprising:

plurality of engine module identifier units, each disposed on an associated engine module, and each providing identification signal information definitive of the associated module type and serial number in response to interrogation signals presented thereto; and a life tracking unit (LTU), including electronic signal processing means having memory means for storing signals, and including transmitting means and receiving means each connected for response to said processing means and to each of said module identifier units, said transmitting means providing the interrogation signals to each of said module identifier units, each provided in response to a related identifier unit command signal presented to said transmitting means from said processing means, said receiving means being responsive to said identification signal information from each module for providing a processor compatible signal manifestation of each to said processing means, said processing means storing each signal manifestation in said memory means at a location therein associated with the particular identifier unit providing the signal information corresponding to said signal manifestation.

2. The system of claim 1, wherein said LTU further includes:

non-volatile memory means having a plurality of addressable signal locations therein for providing non-volatile signal storage of signal information presented thereto; and wherein said processing means presents said signal manifestations corresponding to said identification signal information to said non-volatile memory means, each presented to the particular one of said plurality of addressable signal locations therein associated with the module identifier unit providing said identification signal data to be stored.

3. The system of claim 2, wherein said processing means further includes clock means for providing a real time of day signal, said processing means further presenting for storage in said non-volatile memory means together with each of said signal manifestations, the actual value of said time of day signal coincident therewith.

4. A life tracking system (LTS) for automatically recording the operating history of the engine modules of a gas turbine engine, comprising:
   engine module identifier units, each disposed on an associated engine module, each providing identification signal information definitive of the associated module type and serial number in response to interrogation signals presented thereto;
   engine sensor means, disposed on selected modules of the gas turbine engine, each providing the actual signal value of a selected engine performance parameter associated with the module; and
   a life tracking unit (LTU), including electronic signal processing means responsive to said actual signal values from said engine sensor means, and having clock means for providing a real time of day signal and having memory means for storing signals, said LTU further including receiving means and transmitting means each connected for response to said processing means and to each of said module identifier units, said transmitting means providing the interrogation signals to each of said module identifier units, each provided in response to a related identifier unit command signal presented to said transmitting means from said processing means, said receiving means being responsive to said identification signal information from each identifier unit for providing a processor compatible signal manifestation of each to said processing means, said processing means storing each signal manifestation in said memory means at a location therein associated with the particular identifier unit providing the signal information corresponding to said signal manifestation together with the actual value of said time of day signal coincident therewith, said processing means further storing in said memory means together with the signal manifestation and actual value of the time of day signal for each of the selected engine modules having engine sensor means disposed thereon, the actual signal value of the selected performance parameter corresponding with said actual time of day signal value.

5. The system of claim 4, further comprising:
   non-volatile memory means having a plurality of addressable signal locations therein for providing non-volatile signal storage of signal information presented thereto; and wherein
   said processing means presents said signal manifestations, said coincident time of day signal value, and when present said performance parameter actual signal value, to said non-volatile memory means for storage at the particular ones of said addressable signal locations associated with the module identifier unit providing the related identification signal information.

6. The system of claims 1 or 4 wherein said engine module identifier units comprise:
   a data plate optical mask having a matrix array of signal encoder locations disposed between two parallel major surfaces of the mask, at least one of said major surfaces having visual identification signal characters disposed thereon, each associated with a related one of said encoder locations, said encoder locations being adapted to permit optical encoding of one or more selected identification signal characters to provide said identification signal information by perforation of the mask at the encoder location associated with the selected identification characters, each perforation providing an optical path through said mask at said selected encoder location; and
   an enclosure assembly having a base portion and a cover portion, each including a mating major surface and including a plurality of fiber-optic waveguides disposed therethrough, one end of said waveguides in each portion being terminated at said mating major surface thereof in a matrix array corresponding to that of said matrix of signal encoder locations on said data plate optical mask, the other end of said waveguides in each portion being terminated at said LTU, said cover portion and said base portion being adapted to captively engage said data plate optical mask therebetween with registration of said waveguide matrices with said matrix of signal encoder locations to provide an optical path through said module identifier unit for each encoded identification signal character; wherein
   said identifier unit receives said interrogation signals from said LTU transmitting means in the form of optical energy presented to said waveguides of one of said enclosure assembly portions, and provides said identification signal information as an optical encoded signal through said waveguides associated with the other one of said portions to said receiving means.

7. The system of claim 1 or 4, wherein each of said engine module identifier units comprise:
   data plate assembly means having one or more impedance networks disposed on a major surface thereof, each network being associated with a particular signal character of the identification signal data and each including parallel signal impedance paths connected at predisposed locations on said major surface between an input bus and an output bus of said network, each location being adapted to permit operator interruption of the electrical continuity of said buses at said location to provide each network with a selectable encoded impedance value defined by the sum of one or more of said parallel impedance paths, said major surface having visual identification characters disposed adjacent each of said locations whereby each encoded impedance value corresponds to a visual identification character, said data plate assembly further including first connector means for receiving each network output bus at a related one of a plurality of output bus contacts and for receiving all of said network input buses at a common input bus contact, said first connector means further including a signal source contact connected through a reference impedance value to said common input bus contact; and
   enclosure assembly means, including a base portion and a cover portion each adapted to captively engage said data plate assembly therebetween, said base portion including second connector means for providing electrical interconnection of said first connector means to said LTU; and wherein said data plate assembly receives the interrogation signals presented through said second connector means at said signal source contact to provide, between said common input bus contact and each output bus contact, said identification signal information as the signal indications of the operator selected identification character for each network, each at a magnitude proportional to the ratio of the selected encoded impedance value of the network divided by said reference impedance value.

8. An engine module identifier unit for providing identification signal information definitive of a gas turbine engine module type and serial number to a life tracking unit (LTU) in response to interrogation signals presented by the LTU, comprising:

a data plate optical mask having a matrix array of signal encoder locations disposed between two parallel major surfaces of the mask, at least one of said major surfaces having visual identification signal characters disposed thereon, each associated with a related one of said encoder locations, said encoder locations being adapted to permit optical encoding of one or more selected identification signal characters to provide said identification signal information by perforation of the mask at the encoder location associated with the selected identification characters, each perforation providing an optical path through said mask at said selected encoder locations; and an enclosure assembly having a base portion and a cover portion, each including a mating major surface and including a plurality of fiber-optic waveguides disposed therethrough, one end of said waveguides in each portion being terminated at said mating major surface thereof in a matrix array corresponding to that of said matrix of signal encoder locations on said data plate optical mask, the other end of said waveguides in each portion being terminated at said LTU, said cover portion and said base portion being adapted to captively engage said data plate optical mask therebetween with registration of said waveguide matrices with said matrix of signal encoder locations, to provide an optical path through said module identifier unit for each of said encoded identification signal characters; wherein said identifier unit receives the interrogation signals from the LTU in the form of optical energy presented to said waveguides of one of said enclosure assembly portions and provides the identification signal information as an optical encoded signal through said waveguides associated with the other one of said portions.

9. An engine module identifier unit for providing identification signal information definitive of a gas turbine engine module type and serial number to a life tracking unit (LTU) in response to interrogation signals presented by the LTU, comprising:

data plate assembly means having one or more impedance networks disposed on a major surface thereof, each network being associated with a particular signal character of the identification signal data and each including parallel signal impedance paths connected at predisposed locations on said major surface between an input bus and an output bus of said network, each location being adapted to permit operator interruption of the electrical continuity of said buses at said location to provide each network with a selectable encoded impedance value defined by the sum of one or more of said parallel impedance paths, said major surface having visual identification characters disposed adjacent each of said locations whereby each encoded impedance value corresponds to a visual identification character, said data plate assembly further including first connector means for receiving each network output bus at a related one of a plurality of output bus contacts and for receiving all of said network input buses at a common input bus contact, said first connector means further including a signal contact connected through a reference impedance value to said common input bus contact; and enclosure assembly means, including a base portion and a cover portion each adapted to captively engage said data plate assembly therebetween, said base portion including second connector means for providing electrical interconnection of said first connector means to said LTU; and wherein said data assembly receives the interrogation signals presented through said second connector means at said signal source contact to provide, between said common input bus contact and each output bus contact, the identification signal information as the signal indications of the operator selected identification character for each network, each at a magnitude proportional to the ratio of the selected encoded impedance value of the network divided by said reference impedance value.

* * * * *

UNITED STATES PATENT AND TRADEMARK OFFICE
CERTIFICATE OF CORRECTION

PATENT NO. : 4,280,185
DATED : July 21, 1981
INVENTOR(S) : Anthony N. Martin

It is certified that error appears in the above—identified patent and that said Letters Patent is hereby corrected as shown below:

Column 7, line 12 "42" should be --142--.

Signed and Sealed this

Sixth Day of October 1981

[SEAL]

Attest:

Attesting Officer

GERALD J. MOSSINGHOFF

Commissioner of Patents and Trademarks